United States Patent
Ruf

[15] 3,705,570
[45] Dec. 12, 1972

[54] ROTARY COMBUSTION ENGINE WITH LIQUID-COOLED ROTOR

[72] Inventor: Max Ruf, Obereisesheim, Germany

[73] Assignee: Audi NSU Auto Union Aktiengesellschaft und Wankel GmbH Lindau, Bodensee, Germany

[22] Filed: Oct. 27, 1971

[21] Appl. No.: 193,115

[30] Foreign Application Priority Data

Nov. 23, 1970 Germany..................P 20 57 479.2

[52] U.S. Cl..................................123/8.45, 418/94
[51] Int. Cl. ......................F02b 55/04, F01c 21/06
[58] Field of Search ............123/8.45; 418/94, 91, 61

[56] References Cited

UNITED STATES PATENTS 3,176,915   4/1965   Bentele et al...........................418/61
3,405,693   10/1968  Sparrow................................418/94 X
3,444,842   5/1969   Bensinger et al....................123/8.45

*Primary Examiner*—Carlton R. Croyle
*Assistant Examiner*—Michael Koczo, Jr.
*Attorney*—Raymond P. Wallace et al.

[57] ABSTRACT

An internal rotary combustion engine of the trochoidal type, in which centrifugal forces in the shaft and rotor are utilized to pump and channel lubricating and cooling oil through a hollow rotor, and in which the internal cavity of the rotor is shaped and contoured to assist in pumping and to govern the direction of throughput.

4 Claims, 3 Drawing Figures

INVENTOR.
Max Ruf
BY Raymond P. Wallace
AGENT

ROTARY COMBUSTION ENGINE WITH LIQUID-COOLED ROTOR

BACKGROUND OF THE INVENTION

This invention relates to rotary internal combustion engines having a trochoidal housing with a multiapexed rotor rotatably mounted therein, and more particularly to such an engine wherein the rotor is hollow and is cooled internally by a flow of liquid coolant.

Previous attempts to cool the interior of the rotor by a flow of oil therethrough have been such as that shown in U.S. Pat. No. 3,176,915, wherein the interior of the rotor is partitioned into a plurality of discrete compartments, and oil under pump pressure is sprayed intermittently into each compartment by a jet nozzle as the compartments pass the nozzle. Such an arrangement is cumbersome and complex, and requires expensive construction. Further, the cooling in the prior art patent is substantially uniform throughout the rotor, whereas it is preferable to have cooling principally in the region of the radial apex seals and the axial seals.

SUMMARY

The present invention provides a novel cooling system for the rotor of a rotary internal combustion engine having at least one operating chamber defined by a pair of parallel end walls spaced apart by a peripheral wall of trochoidal type, and having a shaft transpiercing the end walls with an eccentric portion within the operating chamber, and a rotor rotatably mounted on the eccentric portion.

The invention provides a hollow rotor having uninterrupted passage connections between cooling zones in the interior thereof, with cooling and lubricating fluid being supplies by centrifugal force from an axial bore within the shaft. The interior cavity of the rotor is contoured to direct the coolant flow along the interior of the side wall of the rotor to cool the side seals disposed in the side wall, and toward the rotor apexes to cool the apex seals. The cavity at the apex portions is further contoured to direct the flow across the axial width of the rotor to the opposite side wall, where it is then directed radially inwardly by sector-shaped grooves and is eventually discharged axially from the rotor through the ring gear into suitable guttering in the engine housing. The coolant flow within the rotor is maintained by centrifugal forces, and the contouring of the interior cavity is such that the flow of coolant is independent of the direction in which the rotor turns. The simplification of the interior cavity of the rotor makes possible connections of large cross-section for the sand cores for casting the rotor, and hence lowers fabrication costs.

It is an object of this invention to provide novel means for cooling the rotor of a trochoidal rotary engine.

It is another object to provide centrifugal feeding of coolant to the interior of the rotor.

A further object is to provide an improved and inexpensive rotor adapted to internal cooling, in which the coolant flow is independent of the direction of rotation.

Other objects and advantages will become apparent on reading the following specification in conjunction with the accompanying drawings.

DESCRIPTION OF THE PREFERRED EMBODIMENT

Figure 1:
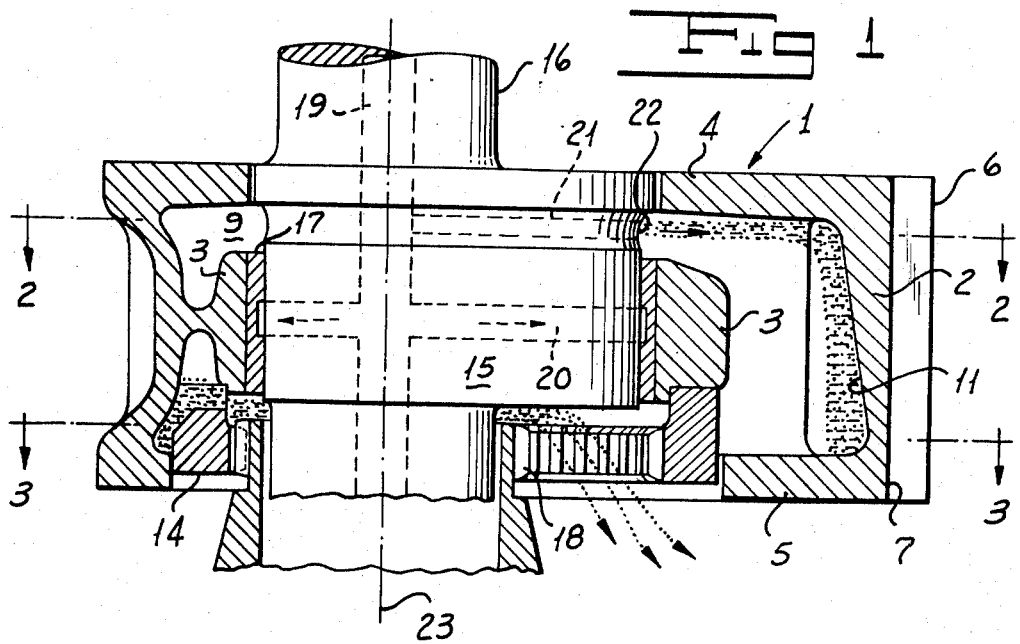
FIG. 1 is a longitudinal cross-section through the rotor of a trochoidal rotary engine.

FIG. 1 shows a rotor 1 as disposed within the housing (not shown) of a trochoidal rotary engine. The rotor comprises an outer peripheral wall 2, an inner wall 3 that serves as a hub, a first side wall 4, and a second side wall 5, the walls defining a hollow cavity within the rotor. The rotor has a profile of generally polyarciform configuration with a plurality of apex portions 6, each apex portion being provided with a groove 7 to take a radial seal (not shown). The interior cavity of the rotor enlarges at each apex portion into the hollow spaces 8a, 8b, and 8c which are all interconnected by a continuous channel or groove 9 around the interior of the rotor adjacent to the first side wall 4 and running substantially parallel to the contour of the rotor; channel 9 is also open radially to the interior of the rotor. The peripheral wall 2 in the apex regions of the rotor is of relatively thick section where it joins the first side wall 4, and tapers to a relatively thin section where it joins the second side wall 5, so that the hollow spaced 8a, 8b, and 8c enlarge radially outwardly from side wall 4 to side wall 57 producing a sloping internal surface 11.

In the region of the second side wall 5 each of the hollow spaces 8a, 8b, and 8c communicates with a pair of sector-shaped grooves 12, each groove 12 originating at the hollow space and running toward the midportion of the rotor periphery, the grooves 12 being separated from each other by web portions 13 disposed substantially midway between apexes, and extending radially inward. In the example shown, the sector-shaped grooves 12 and the hollow spaces 8a, 8b, and 8c are delimited radially inwardly, at the side adjacent to the second side wall 5, by an internal gear 14 which is mounted on the rotor by screws, pins, or other convenient means (not shown). The annulus of the gear 14 is provided with radial passages 14a and 14b therethrough, in register with the inner ends of grooves 12 on each side of webs 13.

The rotor 1 has its hub portion 3 rotatably mounted on an eccentric portion 15 of a shaft 16, with a sleeve bearing 17 disposed between the eccentric and the hub. The internal gear 14 is in engagement with a stationary pinion 18 which is fixed to an end housing wall (not shown) of the trochoidal engine, by means of which a 1 : 3 speed ratio is maintained between the rotor 1 and the shaft 16. In the example shown the shaft and the rotor turn clockwise, but the cooling and lubricating system will operate equally well in an engine arranged for rotation in the opposite direction.

The shaft 16 is provided with a longitudinal bore 19 from which a communicating bore 20 in the eccentric 15 runs to the inner side of the bearing 17. Another transverse bore 21 in the eccentric adjacent to side wall 4 and in the general plane of channel 9 communicates with longitudinal bore 19 and has an outlet 22 in the surface of the eccentric diametrically opposite the rotational axis 23 of the shaft, and in that portion of the eccentric having the greatest radial distance from axis 23.

Figure 2:
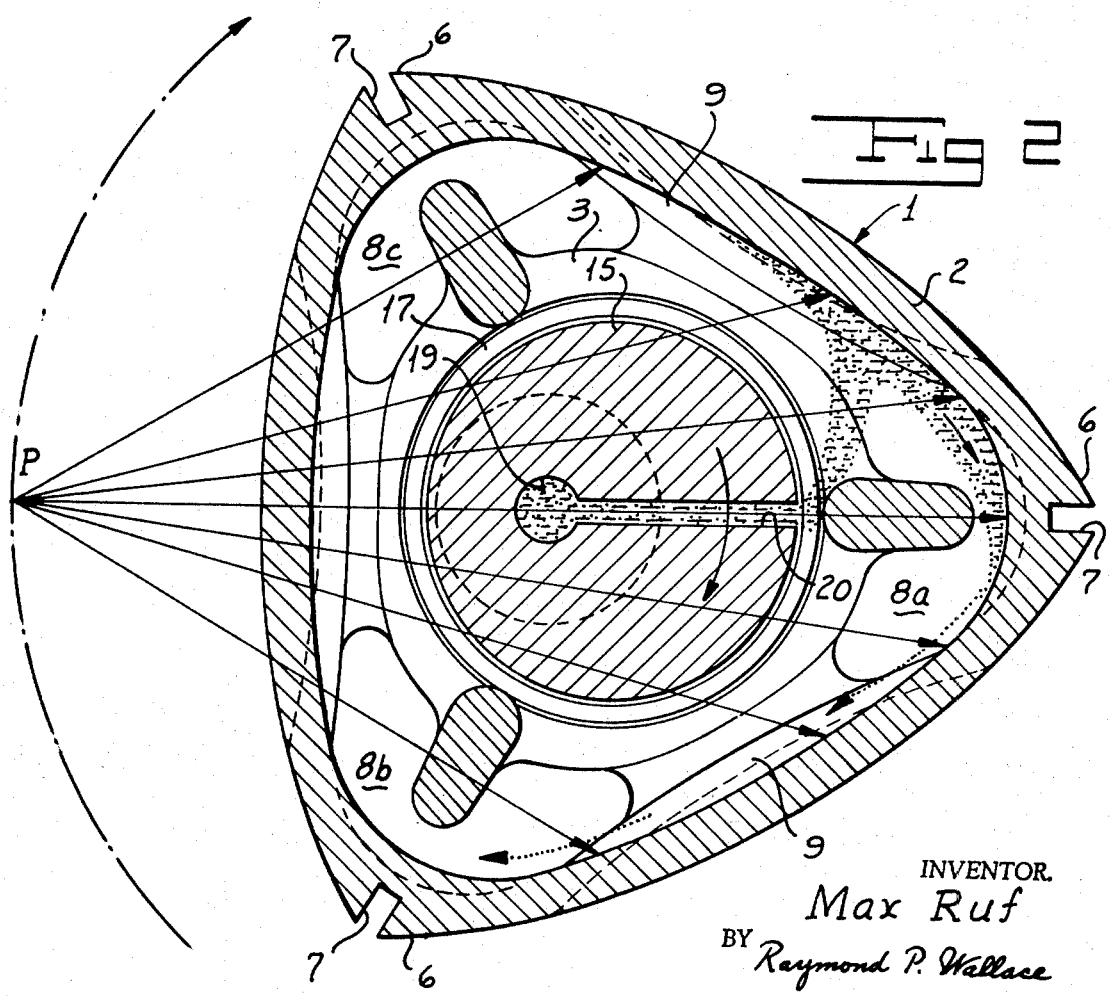
FIG. 2 is a cross-section taken along line 2—2 of FIG. 1.
Figure 3:
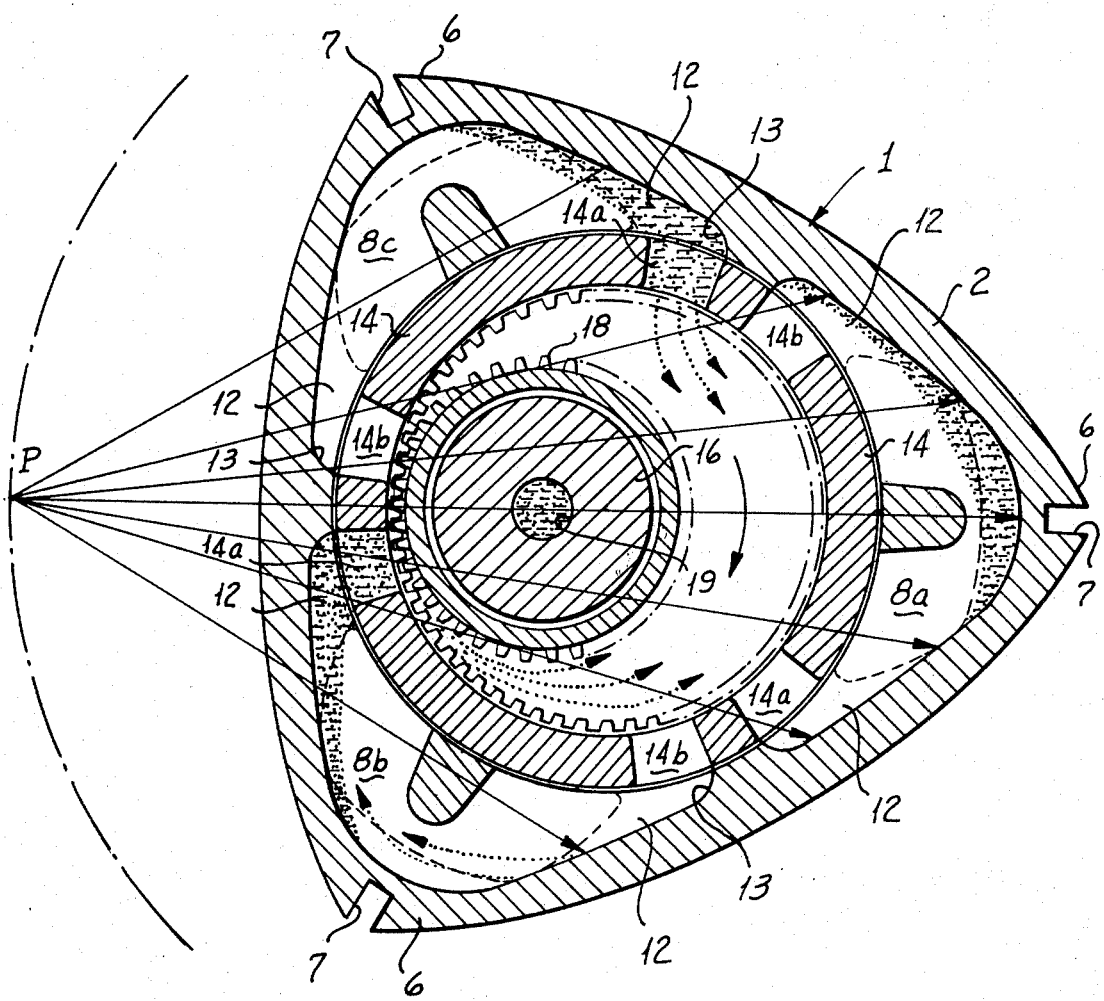
FIG. 3 is a cross-section taken along line 3—3 of FIG. 1.

Lubricating and cooling fluid supplied through bore 19 emerges through orifice 22 of the transverse bore 21, and as shown by stippling in FIG. 2 is sprayed by centrifugal force against the outer wall of continuous groove 9. Since the rotor and shaft are turning within the engine, there is exerted a centrifugal force which may be regarded as vectors of a pole P situated outside the rotor and rotating with the speed of the shaft 16. By means of such centrifugal force the oil or other fluid is impelled outwardly at high speed along groove 9. As soon as the fluid arrives in the region of one of the apex hollow spaces, 8a for example, by the continued action of centrifugal force it traverses the sloping surface 11 axially toward the second side wall 5 and into the leading region of the respective hollow space. From there it is carried away radially inwardly through passages 14a, as shown in FIG. 3, whence it is then discharged axially from the inner diameter of ring gear 14.

Because the shaft 16 turns three times as fast as the rotor 1, the jet of fluid emerging from orifice 22 sweeps the entire circumference of the continuous groove 9, so that efficacious cooling of the parts delimiting this groove, and in particular the rotor side wall 4, is obtained.

The lagging regions of hollow spaces 8a, 8b, and 8c, on the side adjacent to wall 5, are swept but little by the spray of fluid coming from groove 9. Adequate cooling of these lagging regions is obtained in that leakage oil from the rotor bearing 17 arrives at this side by flowing through passages 14b into the sector-shaped grooves 12 and thence into the enlargements of the hollow spaces 8a, 8b, 8c. Leakage oil emerging at the opposite side of the bearing 17, adjacent to wall 4, enters the continuous groove 9.

If the engine is arranged so that the rotor turns in the opposite or counterclockwise direction the cooling fluid also flows in the opposite direction through groove 9, and after flowing through the rotor hollow spaces 8a, 8b, 8c to the side adjacent to wall 5, it is conducted radially inwardly through the sector-shaped grooves 12 and through passages 14b, in the same manner as previously described for grooves 14a. It is evident that the cooling action is independent of the direction of rotation of the rotor.

Although the centrifugal action of the shaft and rotor is sufficient to provide adequate flow through the rotor, it may be desirable to provide a pump in the oil supply system between the sump and the reservoir, in order that the reservoir may be kept full.

What is claimed is:

1. In a rotary internal combustion engine having at least one operating chamber defined by parallel end walls and a peripheral wall of trochoidal type, a shaft transpiercing the end walls, the shaft having an eccentric portion within the operating chamber, and a multiapexed rotor rotatably mounted on the eccentric portion, the improvement comprising:

a. the rotor being hollow and comprising a first side wall, a second side wall, an outer peripheral wall, and an inner peripheral wall serving as a hub, the walls defining an interior cavity within the rotor with a hollow space in each apex portion, the rotor having in its interior cavity a continuous channel adjacent to the first side wall and substantially parallel to the rotor contour and communicating with each apex hollow space and being open radially to the interior cavity, the rotor having in its interior cavity adjacent to the second side wall a web portion extending radially inwardly substantially midway between each pair of adjacent apexes and having a pair of sector-shaped grooves originating in each apex hollow space, each sector-shaped groove leading toward the adjacent web portion and being open in the radially inward direction;

b. the shaft having an axial bore therein for supplying cooling and lubricating fluid and having a transverse bore therein communicating at its inner end with the axial bore to receive fluid therefrom, the transverse bore having an orifice within the rotor cavity between the first side wall and the plane of the rotor hub portion, the orifice discharging fluid into the continuous channel adjacent to the first side wall of the rotor.

2. The combination recited in claim 1 wherein the transverse bore is in the eccentric and has its orifice in the surface of the eccentric diametrically opposite to the rotational axis of the shaft and in that portion of the eccentric having the greatest radial distance from the shaft axis.

3. The combination recited in claim 1, wherein the rotor bears on the side of the second side wall an annulus having internal gear teeth, the annulus having a plurality of radial passages therethrough, each such radial passage being in register with the radially inner end of one of the sector-shaped grooves.

4. The combination recited in claim 3, wherein the peripheral wall of the rotor has a relatively thick cross-section adjacent to the first side wall and becomes progressively thinner to a relatively thin cross-section adjacent to the second side wall to produce an interior surface sloping radially outwardly from the first side wall to the second side wall to propel fluid by centrifugal force across the axial width of the rotor cavity, the fluid then entering the sector-shaped grooves and discharging radially inwardly through the radial passages in the gear annulus.

* * * * *